United States Patent [19]
Morris

[11] 3,966,340
[45] June 29, 1976

[54] TWIST LOCK CONNECTOR

[76] Inventor: Max O. Morris, 582 E. Sunset Highway, Issaquah, Wash. 98027

[22] Filed: Feb. 27, 1975

[21] Appl. No.: 553,796

[52] U.S. Cl. .................................. 403/353; 16/2; 24/221 R; 248/188.8; 108/156
[51] Int. Cl.² ...................... F16B 9/02; B25G 3/00; F16D 1/00
[58] Field of Search ...................... 403/353; 16/2, 3; 24/221 R, 221 A, 221 L, 221 CC; 297/440; 248/188, 188.8; 108/156

[56] References Cited
UNITED STATES PATENTS

| | | | |
|---|---|---|---|
| 1,102,079 | 6/1914 | Rizer | 403/353 X |
| 3,407,454 | 10/1968 | Myatt | 24/221 R |
| 3,849,839 | 11/1974 | Zimber | 24/221 R X |

*Primary Examiner*—Werner H. Schroeder
*Assistant Examiner*—Wayne L. Shedd
*Attorney, Agent, or Firm*—Bell, Seltzer, Park & Gibson

[57] ABSTRACT

A twist lock connector for use in connecting and disconnecting components, such as knock-down furniture components, and being characterized by a construction which provides easy selective progressive friction locking and unlocking thereof to a selected degree by opposite relative right-hand or left-hand rotation of a correlated amount.

11 Claims, 12 Drawing Figures

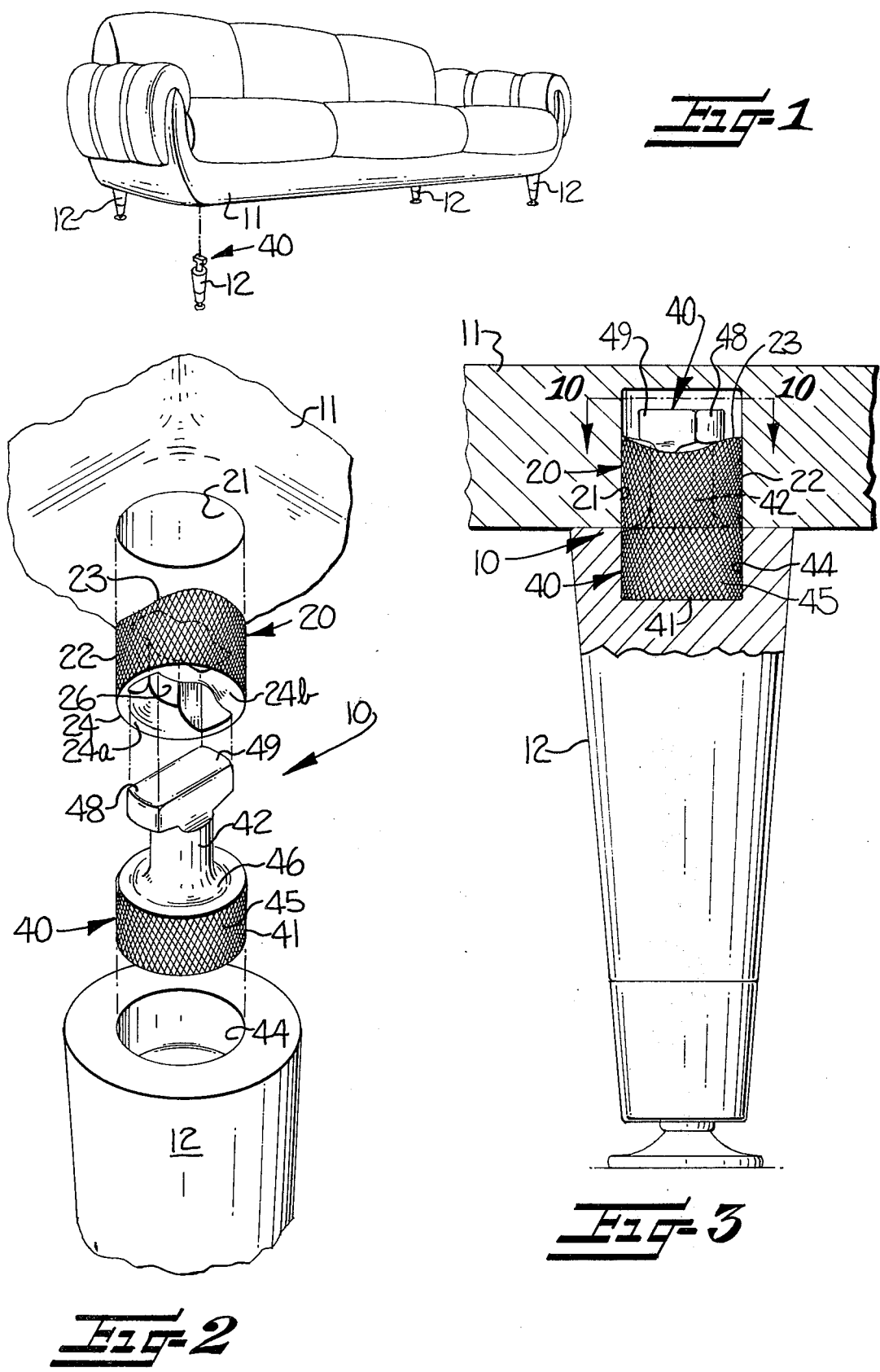

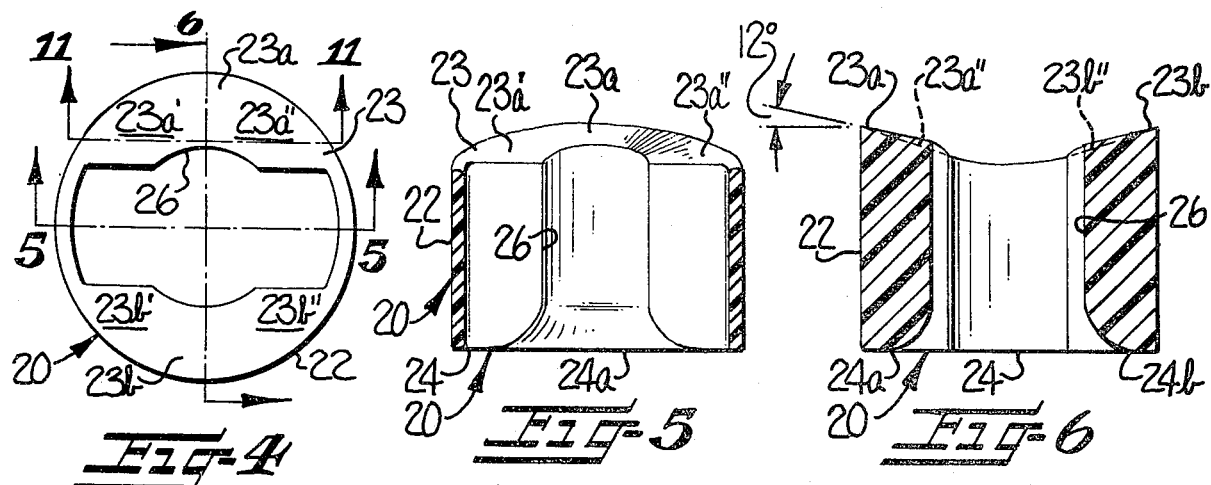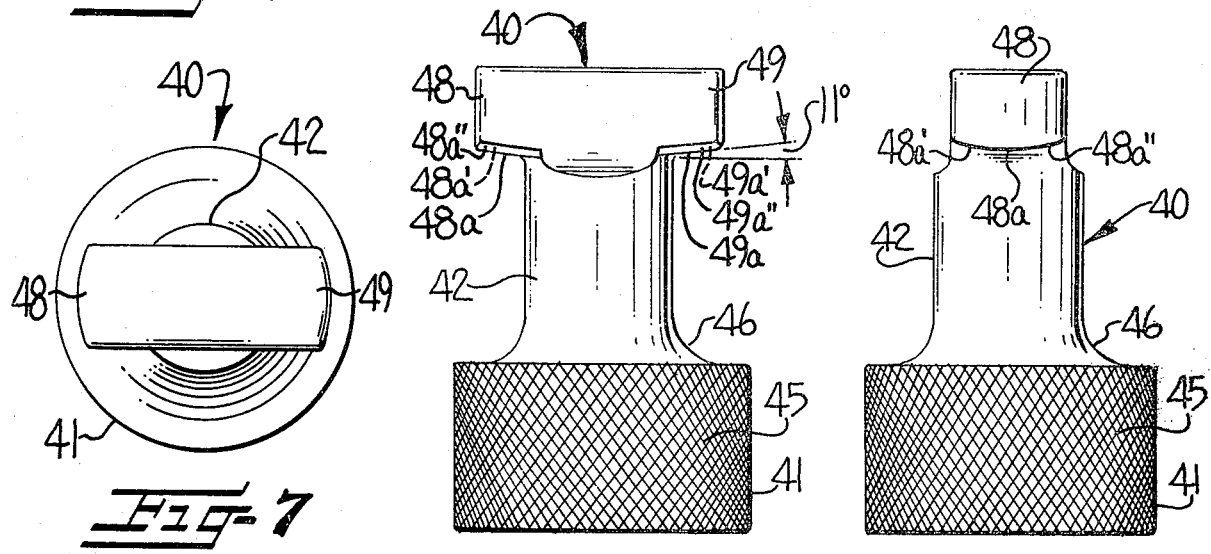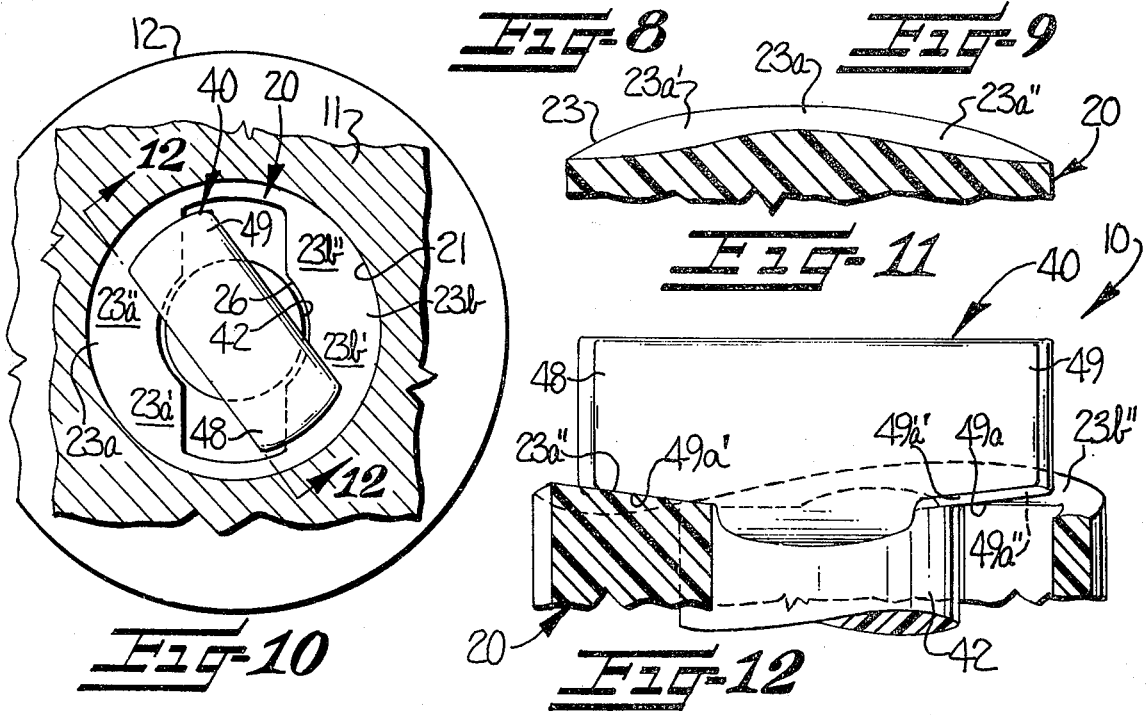

TWIST LOCK CONNECTOR

This invention is directed to a twist lock connector for use in connecting and disconnecting components, such as knock-down furniture components, and is characterized by a construction which provides easy locking and unlocking thereof by opposite relative right-hand or left-hand rotation and preferably is adapted to be completely concealed within the connected components to be hidden from view.

BACKGROUND OF THE INVENTION

In connecting components of various end products, in which the components are to be selectively assembled and disassembled, connectors are desirable for accomplishing this selective assembly and disassembly between the components. This is particularly true in knock-down furniture, which is becoming increasingly popular, for purposes of assembling the furniture components for normal use of the furniture and allowing disassembly of the components when storing or shipping of the furniture is desired.

Although a wide variety of connectors, including those which lock and unlock by relative rotation of the members thereof, have previously been proposed for various components, including knock-down furniture components, these previously proposed twist lock connectors have suffered from design deficiencies and lack of flexibility in their use. For example, the previously proposed twist lock connectors have been complicated in design rendering them expensive to manufacture and have been limited to relative rotation of the members for locking thereof in only one left-hand or right-hand direction, but not in either direction depending upon the desired orientation of the assembled components. Also, for the most part, these previously proposed connectors left portions thereof exposed when the furniture or other type of components were assembled which was undesirable from an asthetic standpoint. Additionally, the constructions of these previously proposed connectors have not been suitable for fabrication from inexpensive materials and for mass production for producing inexpensive connectors for use in the industry.

Examples of such prior connectors are disclosed in the following United States Patents.

| Patent No. | Inventor | Issue Date |
| --- | --- | --- |
| 135,655 | J. C. Miller et al | February 11, 1873 |
| 2,574,648 | J. H. Mason | November 13, 1951 |
| 3,515,418 | R. N. Nielson, Jr. | June 2, 1970 |
| 3,640,576 | A. T. Morrison et al | February 8, 1972 |
| 3,661,411 | K. E. Flick | May 9, 1972 |
| 3,749,432 | L. M. L. Jaissen | July 31, 1973 |
| 3,778,102 | B. L. Snyder et al | December 11, 1973 |
| 3,811,157 | P. Schenk | May 21, 1974 |

SUMMARY OF THE INVENTION

Accordingly, it is the object of this invention to provide a twist lock connector for use in selective connecting and disconnecting of components, such as knock-down furniture components, which may be locked by relative rotation of the members thereof in either a right-hand or left-hand direction for assembling the components in desired orientation and which may be unlocked upon relative rotation in the opposite direction for disassembling the components.

It is a further object of this invention to provide such a twist lock connector which is adapted to be completely concealed within the components when in the assembled condition.

It is a still further object of this invention to provide such a twist lock connector which is constructed of relatively inexpensive materials, is uncomplicated in design, and may be mass produced.

It has been found by this invention that the above objects may be broadly accomplished by providing a twist lock connector, as follows.

A female member is provided for attachment to one of the components to be assembled and has opposite outer ends and a longitudinally extending passageway therethrough defining a pair of opposing end walls on each side of the passageway on each of the outer ends. The opposing end walls on one of the outer ends each defines opposing camming surfaces thereon. An elongate, longitudinally extending, male member is provided having opposite end portions, in which one of the end portions is adapted for attachment to the other of the components to be assembled and has an inside face for abutment with the other end of the female member. The other of the end portions comprises a predetermined configuration for extending through and out of the passageway in the female member at the one end and includes at least one flange member projecting transversely outwardly therefrom for being positioned outside of the one end of the female member and has an inside wall defining opposing camming surfaces for cooperatively frictionally engaging and locking with the opposing camming surfaces on the end walls of the one end of the female member upon rotation in either a right-hand or left-hand direction of one of the members relative to the other and for unlocking upon relative rotation in the opposite direction.

Preferably, the female member is constructed for being secured within a bore of one of the components to be assembled and the one end portion of the male member is constructed for being secured within a bore of the other of the components to be assembled so that when the male and female members are locked together, the connector will be concealed within the connected components.

It is also preferable for the other end portion of the male member to comprise a generally T-shaped configuration which includes two of the flange members, defined above, forming the upper portion of the T-shaped configuration for respectively engaging and frictionally locking with one of the camming surfaces on each of the wall members on the one of the outer ends of the female member.

Additionally, it is preferred to construct the twist lock connector of this invention of molded, high impact plastic for mass production to produce inexpensive connectors.

Further details of the specific preferred embodiment of the present invention will be set forth in the detailed description to follow.

BRIEF DESCRIPTION OF THE DRAWINGS

Some of the objects and advantages of this invention having been set forth, other objects and advantages will appear as the description proceeds, when taken in conjunction with the accompanying drawings, in which:

FIG. 1 is a perspective view of an item of furniture having knock-down components or legs utilizing the twist lock connector of this invention and illustrating one of the legs in disassembled condition and the other legs in assembled condition;

FIG. 2 is an exploded perspective view of the twist lock connector of this invention and portions of the components to which the members thereof are attached;

FIG. 3 is an enlarged, elevational view, partly in section, of the components of the article of furniture of FIG. 1 in assembled condition utilizing the twist lock connector of this invention;

FIG. 4 is a top plan view of one end of the female member of the twist lock connector of this invention;

FIG. 5 is a sectional view, taken generally along the line 5—5 of FIG. 4;

FIG. 6 is a sectional view, taken generally along the line 6—6 of FIG. 4;

FIG. 7 is a top plan view of the male member of the twist lock connector of this invention;

FIG. 8 is a side elevational view of the male member of FIG. 7;

FIG. 9 is a side elevational view of the other side of the male member of FIG. 7;

FIG. 10 is an enlarged top plan view of the assembled twist lock connector of this invention illustrated in FIG. 3 and taken generally along the line 10—10 of FIG. 3;

FIG. 11 is a partial cross-sectional view, taken generally along the line 11—11 of FIG. 4; and FIG. 12 is a partial, cross-sectional view taken generally along the line 12—12 of FIG. 10.

DESCRIPTION OF PREFERRED EMBODIMENT

Referring now to the drawings, the twist lock connector of this invention is referred to generally at 10. The twist lock connector 10 may be utilized in connecting components, such as furniture components 11 and 12 which, as shown in FIG. 1, are a sofa 11 and legs 12. However, it is to be understood that the twist lock connector 10 of this invention may be utilized for connecting any components including any knock-down furniture components or other components which are desired to be selectively assembled and disassembled.

The twist lock connector 10 comprises a female member 20 for attachment to one of the components to be assembled. Preferably, the female member is generally cylindrical shaped for being secured within a generally cylindrical shaped bore 21 of one of the components 11 to be assembled. For this purpose, the outside surface 22 of the generally cylindrical shaped female member 20 is preferably roughened, by knurling or otherwise, for facilitating attachment thereof to the inside of the cylindrical bore 21 of the component 11 by the use of glue or other means. As may be seen in FIG. 3, the bore 21 is slightly longer in length than the female member 20 so as to provide a cavity above the female member 20, for purposes to be discussed below, and the female member 20 would be positioned flush with the bottom surface of the component 11 and the bore 21 to be concealed therewithin.

As shown in FIGS. 2 and 4–6, the female member 20 has opposite outer ends 23, 24 and a longitudinally extending passageway 26 of predetermined configuration therethrough defining pairs of opposing end walls 23a, 23b and 24a, 24b on the outer end 23, 24 on each side of the passageway 26. The outer ends 23, 24 are generally concave in overall configuration and the opposing end walls 23a, 23b on one outer end 23 each comprise a curved, generally convex configuration, having an increasingly rising, tapering height from the inside to the outside, to define generally curved, opposing, upwardly extending, rising, merging, camming surfaces 23a', 23a'' and 23b', 23b'' on respective end walls 23a, 23b on the one outer end 23.

In a commercial embodiment of the twist lock connector 10 of this invention, it has been found that the opposing camming surfaces 23a', 23a'' and 23b', 23b'' on the end walls 23a, 23b of the one outer end 23 of the female member 20 should define an included angle of 12° at the juncture of the camming surfaces (see FIG. 6) with respect to a perpendicular transverse axis to the female member 20, for purposes to be discussed below.

The twist lock connector 10 further comprises an elongate, longitudinally extending, male member 40 having opposite end portions 41, 42. Preferably, the end portion 41 is generally cylindrical in overall configuration for being secure within a generally cylindrical shaped bore 44 of the other component 12 to be assembled. For this purpose, the outside surface 45 of the cylindrical shaped end portion 41 of the male member 40 is preferably roughened, by knurling or otherwise, for facilitating attachment thereof to the inside of the cylindrical bore 44 of the component 12 by the use of glue or other means. As may be seen in FIG. 3, the bore 44 is of sufficient dimensions for receiving the entire cylindrical end portion 41 of the male member 40 to be concealed therewithin. The end portion 41 of the male member 40 includes an inside face 46 which is generally convex in overall configuration for abutting with and being matingly received against the other end 24 of the female member 20.

The other of the end portions 42 of the male member 40 comprises a generally T-shaped configuration of predetermined dimensions for extending through and out of the passageway 26 in the female member 20 at the one end 23 thereof when the generally convex face 46 of the male member 40 is brought into abutting, mating engagement with the generally concave other end 24 of the female member 20. This abutting, mating engagement aids in longitudinal axial alignment of the male member 40 and the female member 20.

The generally T-shaped end portion 42 of the male member 40 includes a pair of integral, oppositely extending, flange members 48, 49 projecting transversely outwardly therefrom and forming the upper portion of the T-shaped configuration for being positioned outside of the one end 23 of the female member 20 when the end portion 42 of the male member 40 is inserted through the passageway 26 of the female member 20. Each of the flange members 48, 49 have an inside wall 48a, 49a respectively, comprising in the longitudinal and transverse directions a curved, generally convex configuration, having an increasingly tapering height from the inside to the outside, to define generally curved, upwardly extending camming surfaces 48a', 48a'' and 49a', 49a'' on each of the flange members 48, 49 for cooperatively frictionally engaging and locking with opposing camming surfaces 23a', 23a'' and 23b', 23b'' on the end walls 23a, 23b of the one end 23 of the female member 20 upon rotation in either a right-hand or left-hand direction of one of the members 20, 40 relative to the other and for unlocking upon relative rotation in the opposite direction.

For example, if the male member 40, as positioned in FIG. 7, is inserted into and through the passageway 26 in the female member 20, as positioned in FIG. 4, the male member 40 may be rotated in a right-hand direction or clockwise direction for engagement of the camming surface 48a' with the camming surface 23a' and engagement of the camming surface 49a'' with the camming surface 23b'' for locking of the male member 40 with the female member 20. Or, the male member may be rotated in a left-hand or counterclockwise direction for frictional engagement and locking of the camming surface 48a'' with the camming surface 23b' and the camming surface 49a' with the camming surface 23a'' (as shown in FIG. 10).

In a commercial embodiment of the twist lock connector 10 of this invention, it has been found that if the cooperating camming surfaces 48a', 48a'' and 49a', 49a'' on each of the flange members 48, 49, respectively, of the male member 40 define an 11° included angle at the highest point or juncture thereof with respect to a perpendicular transverse axis to the male member, as shown in FIG. 8, a tight frictional engagement and locking of the male member with respect to the female member along the entire dimension of the camming surfaces will be obtained.

The female member 20 and the male member 40 are preferably constructed of molded, high impact plastic, such as styrene, for mass production for producing inexpensive twist lock connectors.

Thus, this invention has provided a twist lock connector for use in connecting and disconnecting components, such as knock-down furniture components, and which is characterized by a construction which provides easy selective locking and unlocking thereof by opposite relative right-hand or left-hand rotation, which may be completely concealed within the connected components, and which may be easily and inexpensively mass produced of a molded high impact plastic material for producing inexpensive twist lock connectors.

In the drawings and specification there has been set forth a preferred embodiment of the invention, and although specific terms are employed, they are used in a generic and descriptive sense only and not for purposes of limitation.

What is claimed is:

1. A twist lock connector for use in connecting and disconnecting components, such as knock-down furniture components, and being characterized by a construction which provides easy selective progressive friction locking and unlocking thereof to a selected degree by opposite relative right-hand or left-hand rotation of a correlated amount; said connector comprising:

a female member for attachment to one of the components to be assembled and having opposite outer ends and a longitudinally extending passageway therethrough defining a pair of opposing end walls on each side of said passageway on each of said outer ends, said opposing end walls on one of said outer ends each defining opposing camming surfaces thereon; and an elongate, longitudinally extending male member having opposite end portions, one of said end portions being adapted for attachment to other of the components to be assembled and having an inside face for abutment with said other end of said female member, the other of said end portions comprising a predetermined configuration for extending through and out of said passageway in said female member at said one end and including at least one flange member projecting transversely outwardly therefrom for being positioned outside of said one end of said female member and having an inside wall defining opposing camming surfaces for cooperatively frictionally engaging and progressively frictionally locking to a desired selective degree with said opposing camming surfaces on said end walls of said one end of said female member upon rotation by a selective predetermined force in either a right-hand or left-hand direction of one of said members relative to the other an amount correlated to the desired degree of frictional locking and for unlocking upon relative rotation by at least an equal force in the opposite direction an amount at least equal to the amount utilized for locking said members.

2. A twist lock connector, as set forth in claim 1, in which said other end portion of said male member comprises generally a T-shaped configuration and includes two of said flange members forming the upper portion of the T-shaped configuration.

3. A twist lock connector for use in connecting and disconnecting components, such as knock-down furniture components, and being characterized by a construction which provides easy selective progressive friction locking and unlocking thereof to a selected degree by opposite relative right-hand or left-hand rotation of a correlated amount and which is adapted to be completely concealed within the connected components; said connector comprising:

a female member for being secured within a bore of one of the components to be assembled and having opposite outer ends and a longitudinally extending passageway of predetermined configuration therethrough defining a pair of opposing end walls on each side of said passageway on each of said outer ends, one of said outer ends being generally concave in overall configuration, said opposing end walls on said one outer end each comprising a curbed, generally convex configuration defining generally curved, opposing, rising, merging camming surfaces on each of said opposing end walls on said one outer end; and an elongate, longitudinally extending, male member having opposite end portions, one of said end portions being adapted for being secured within a bore of the other of the components to be assembled and includes an inside face for abutment with said other end of said female member, the other of said end portions comprising a predetermined configuration for extending through and out of said passageway in said female member at said one end and including at least one flange member projecting transversely outwardly therefrom for being positioned outside of said one end of said female member and having an inside wall comprising in the longitudinal and transverse directions a curved, generally convex configuration defining generally curved, upwardly extending, opposing, merging camming surfaces for cooperatively frictionally engaging and progressively frictionally locking to a desired selective degree with said opposing camming surfaces on said end walls of said one end of said female member upon rotation by a selective predetermined force in either a right-hand or left-hand direction of one of said members relative to the other an amount correlated to the desired degree of frictional locking and for unlocking upon relative rotation by at least an equal force in the opposite direction an amount at least equal to the amount utilized for locking said members.

4. A twist lock connector, as set forth in claim 3, in which said female member comprises a generally cylindrical shaped member for insertion within a cylindrical bore of the one of the components to be assembled for being completely concealed within such component, and said one of said end portions of said male member comprising a generally cylindrical shape for being inserted within a generally cylindrical shaped bore in the other of the components to be assembled for being completely concealed therewithin.

5. A twist lock connector, as set forth in claim 4, in which said cylindrically shaped female member includes a roughened outer surface thereon for facilitating attachment thereof to the inside of the cylindrical bore of the one of the components to be assembled, and said one end portion of said male member of cylindrical shape includes a roughened outside surface for facilitating attachment thereof to the inside surface of the cylindrical bore of the other of the components to be assembled.

6. A twist lock connector, as set forth in claim 3, in which said female member and said male member comprise molded, high impact, plastic members.

7. A twist lock connector, as set forth in claim 3, in which said other end of said female member comprises a generally concave overall configuration and said inside face of said one end portion of said male member comprises a generally cooperating convex configuration for mating abutment with said other end of said female member when said other end portion of said male member is inserted through said female member to aid in axial alignment of said members.

8. A twist lock connector for use in connecting and disconnecting components, such as knock-dowb furniture components, and being characterized by a construction which provides easy selective progressive friction locking and unlocking thereto to a selected degree by opposite relative right-hand or left-hand rotation of a correlated amount and which is adapted to be completely concealed within the connected components; said connector comprising:

a generally cylindrically shaped, female member for being secured within a cylindrical bore of one of the components to be assembled and having opposite outer ends and a longitudinally extending passageway of predetermined configuration therethrough defining a pair of opposing end walls on each side of said passageway on each of said outer ends, one of said outer ends being generally concave in overall configuration, said opposing end walls on said one outer end each comprising a curved, generally convex configuration defining generally curved, opposing, rising, merging, camming surfaces on each of said opposing end walls on said one outer end; and an elongate, longitudinally extending, male member having opposite end portions, one of said end portions being generally cylindrical in overall configuration for being secured within a cylindrical bore of the other of the components to be assembled and including an inside face for abutment with said other end of said female member, the other of said end portions comprising a generally T-shaped configuration of predetermined dimensions for extending through and out of said passageway in said female member at said one and including a pair of oppositely extending flange members forming the upper portion of the T-shaped configuration thereon and projecting transversely outwardly therefrom for being positioned outside of said one end of said female member, each of said flange members having an inside wall comprising in the longitudinal and transverse directions a curved, generally convex configuration defining generally curved, upwardly extending, opposing, merging, camming surfaces on each of said flange members for cooperatively frictionally engaging and progressively frictionally locking to a desired selective degree with said opposing camming surfaces on said end walls of said one end of said female member upon rotation by a selective predetermined force in either a right-hand or left-hand direction of one of said members relative to the other an amount correlated to the desired degree of frictional locking and for unlocking upon relative rotation by at least an equal force in the opposite direction an amount at least equal to the amount utilized for locking said members.

9. A twist lock connector, as set forth in claim 8, in which said cylindrically shaped female member includes a roughened outer surface thereon for facilitating securement thereof to the inside of the cylindrical bore of the one of the components to be assembled, and said one end portion of said male member of cylindrical shape includes a roughened outside surface for facilitating securement thereof to the inside surface of the cylindrical bore of the other of the components to be assembled.

10. A twist lock connector, as set forth in claim 8, in which said female member and said male member comprise molded, high impact plastic members.

11. A twist lock connector, as set forth in claim 8, in which said opposing camming surfaces on each of said end walls on said one end of said female member define an included angle of 12° at the juncture of said camming surfaces with respect to a perpendicular transverse axis to said female member, and said cooperating camming surfaces on each of said flange members of said male member define an 11° included angle at the highest point thereof with respect to a perpendicular transverse axis to said male member.

* * * * *